United States Patent [19]

Hill et al.

[11] Patent Number: 5,366,541

[45] Date of Patent: Nov. 22, 1994

[54] FLUID FRACTIONATOR

[75] Inventors: Charles C. Hill, Del Mar; Theodore B. Hill, San Diego, both of Calif.

[73] Assignee: Dynotec Corporation, San Diego, Calif.

[21] Appl. No.: 142,614

[22] Filed: Oct. 25, 1993

Related U.S. Application Data

[63] Continuation of Ser. No. 835,918, Feb. 28, 1992, Pat. No. 5,268,021, which is a continuation-in-part of Ser. No. 660,177, Feb. 25, 1991, Pat. No. 5,112,367, which is a continuation of Ser. No. 438,786, Nov. 20, 1989, abandoned.

[51] Int. Cl.⁵ ............................................. B01D 53/04
[52] U.S. Cl. ........................................... 96/124; 96/130; 96/133; 96/144; 96/149
[58] Field of Search ............... 96/124, 128, 130, 133, 96/144, 149

[56] References Cited

U.S. PATENT DOCUMENTS

| | | | |
|---|---|---|---|
| 2,507,028 | 5/1950 | Lockwood | 96/149 |
| 2,586,670 | 2/1952 | Lambertsen | 96/149 |
| 2,593,132 | 4/1952 | Gannon | 96/149 X |
| 3,323,292 | 6/1967 | Brown | 96/130 X |
| 4,194,891 | 3/1980 | Earls et al. | 96/130 X |
| 4,272,265 | 6/1981 | Snyder | 96/124 X |
| 4,302,224 | 11/1981 | McCombs et al. | 96/128 X |
| 4,349,357 | 9/1982 | Russell | 96/128 X |
| 4,439,213 | 3/1984 | Frey et al. | 96/130 X |
| 4,440,548 | 4/1984 | Hill | 96/130 X |
| 4,584,001 | 4/1986 | Dechene | 96/133 X |
| 4,631,073 | 12/1986 | Null et al. | 96/130 X |
| 4,787,417 | 11/1988 | Windsor, Jr. | 96/124 X |
| 4,880,443 | 11/1989 | Miller et al. | 96/130 X |
| 4,925,464 | 5/1990 | Rabenau et al. | 96/124 |
| 5,112,367 | 5/1992 | Hill | 96/130 X |
| 5,114,441 | 5/1992 | Kanner et al. | 96/124 X |
| 5,122,164 | 6/1992 | Hirooka et al. | 96/130 X |
| 5,268,021 | 12/1993 | Hill et al. | 96/130 X |

*Primary Examiner*—Robert Spitzer
*Attorney, Agent, or Firm*—Ellsworth R. Roston; Charles H. Schwartz

[57] ABSTRACT

Improved apparatus for fractionating fluid mixtures by pressure swing molecular adsorption employing a rotary distributor valve and an array of adsorber columns. The columns are, in one embodiment, contained within a product holding tank or, in another embodiment, attached to a product tank. The valve sequences to provide a quasi steady-state flow, allowing optimization of adsorption/desorption cycles, and eliminating most of the valves, switches and plumbing usually required.

48 Claims, 7 Drawing Sheets

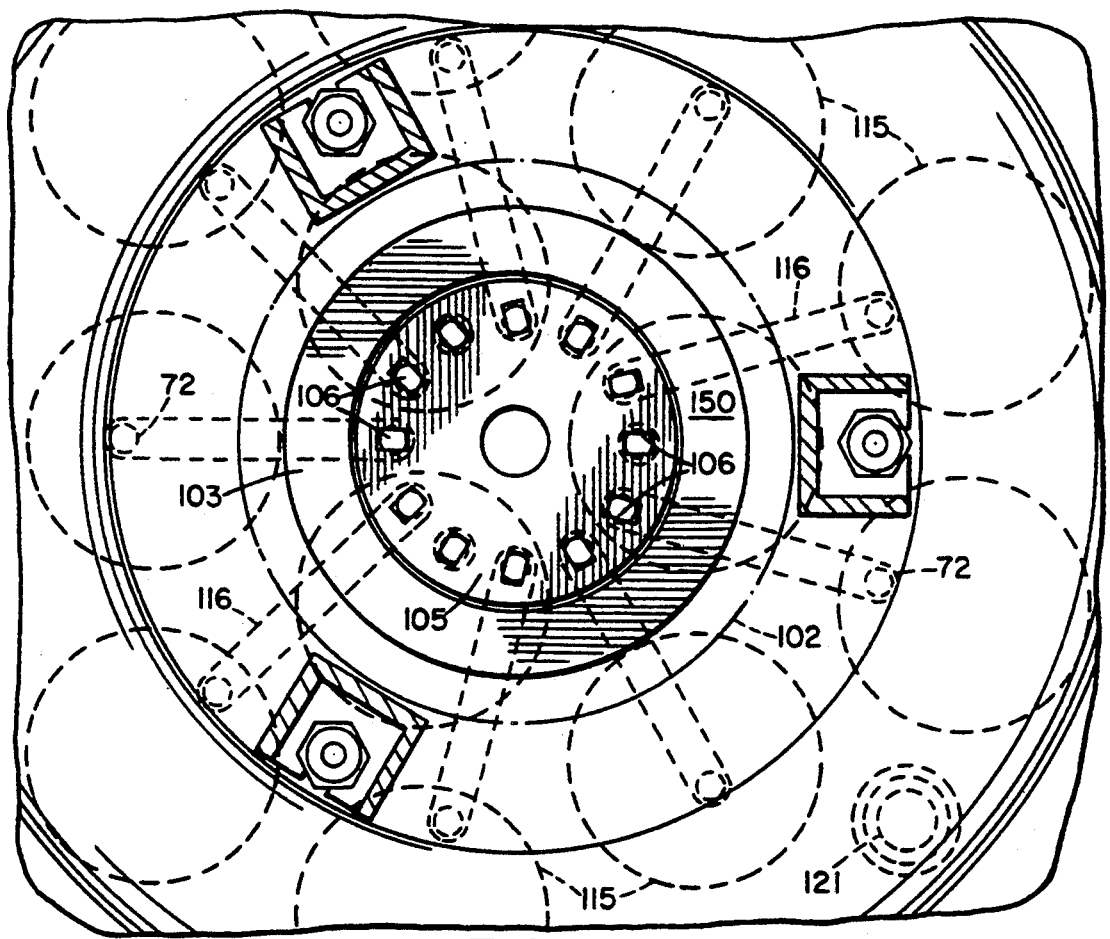
FIG. 14
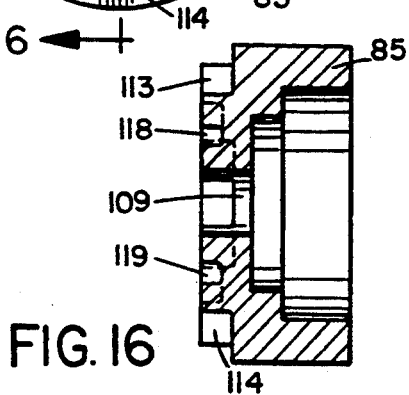
FIG. 15
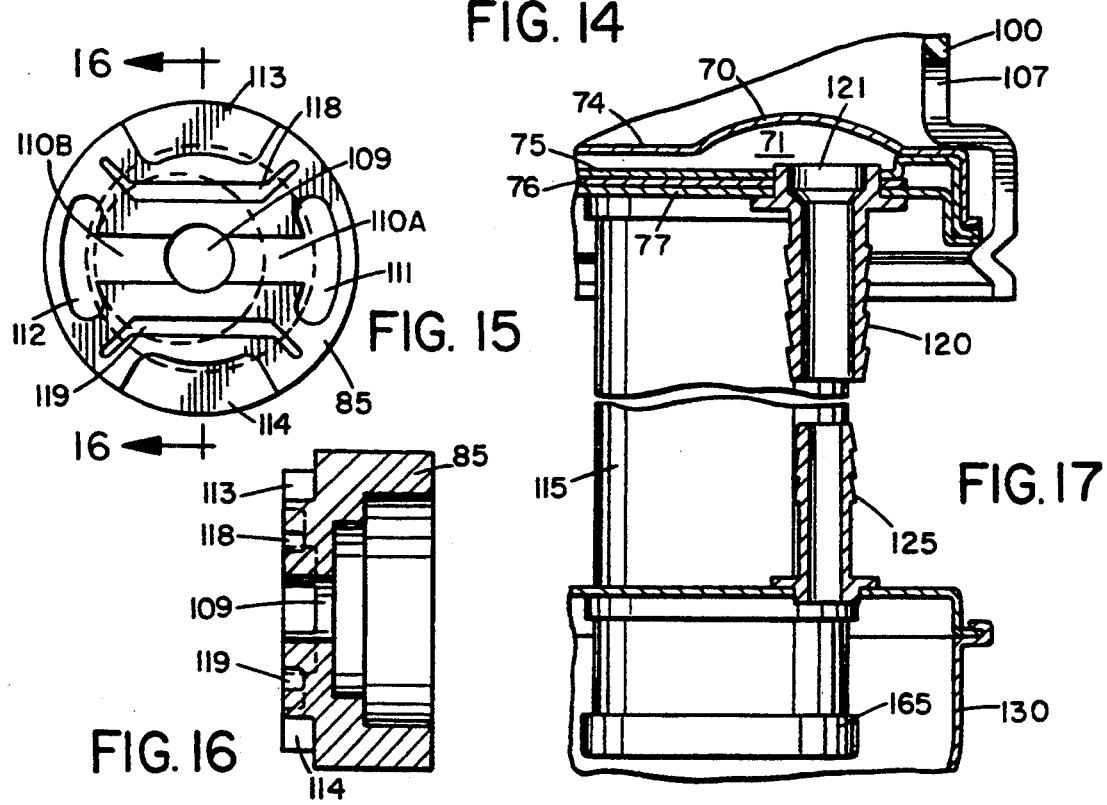
FIG. 17
FIG. 16

FLUID FRACTIONATOR

This is a continuation of application Ser. No. 07/835,918 filed Feb. 28, 1992 (now U.S. Pat. No. 5,268,021), which in turn is a continuation-in-part of Ser. No. 07/660,177 filed Feb. 25, 1991 (now U.S. Pat. No. 5,112,367), which in turn is a continuation of application Ser. No. 07/438,786 filed Nov. 20, 1989, now abandoned.

BACKGROUND OF THE INVENTION

1. Field of the Invention

This invention relates to an improved apparatus and method for purifying a fluid product by removing certain components of a fluid mixture or contaminants from a source of a single fluid. Since this invention is effective in separation of gases and liquids, depending on circumstances, the term fluid will be used as much as possible. It is understood that the term includes gases and liquids. Although focus is directed to the medical use as a respiratory support in the present embodiment, this invention is also useful in other situations where zeolites and sieve materials are employed, for example oil refinery procedures.

2. Description of the Related Art

The use of selectively adsorbent molecular sieve materials having uniform pore sizes in separation of fluid components has been in practice since about 1948, with the first industrial research efforts occurring at Union Carbide Corporation. Based on the first experimental observations of the adsorption of gases on naturally occurring zeolites and the behavior of the latter as molecular sieves by Barrer in 1945 (J. Soc. Chem. Ind., 64:130), Milton and coworkers at Union Carbide synthesized the first industrial zeolite molecular sieves in 1948 (R. M. Milton, Molecular Sieves, Soc. Chem. Ind., London, 1968, p. 199), and they were test marketed in 1954.

Most separations of fluid mixtures by adsorption require regeneration of the adsorbent after saturation with the adsorbate. Since most separations are performed on fixed-bed columns, complex mechanisms involving intricate networks of interconnected and interoperating valves and switches have been devised to implement adsorption and desorption cycles in order to facilitate regeneration.

Costly and elaborate equipment like that described above is suitable for large scale commercial operations where the equipment is constantly monitored by competent technicians. However, in dealing with the problem of supplying relatively small quantities of oxygen to patients, especially at home, size, ease of operation and, even more importantly, reliability are the primary concerns.

The use of synthetic molecular sieves in a two-bed, pressure swing adsorber for separation of oxygen from air for medical and industrial applications became commercially practical in the early 1970's and many manufacturers build such equipment.

The components in a typical two column system currently available are:
- Air compressor
- Heat exchanger
- Air receiver or surge tank
- Two molecular sieve chambers
- Two pressure dropping orifices
- Product tank (oxygen receiver)
- Four or five two-way solenoid operated directional flow control valves (or, alternatively, one 4-way valve and one 2-way valve)
- Electrical or electronic sequencing timer control for the valves
- Pressure reducing regulator for oxygen product flow
- Intake and exhaust silencers
- Intake and product filters
- Adjustable flow control valve for oxygen product
- Connecting tubing and fittings to conduct fluid flows into and out of components The above list of components clearly indicates the complexity of a typical medical oxygen concentrator respiratory support system), requiring a network interconnected parts acting in concert. This complexity can give rise to the prospect of decreased reliability, and the chance that some component will malfunction, or a connection leak will develop, rendering the entire apparatus incapable of performing its life-support function.

The compressor discharge profile in a two column system, when plotted against time manifests a "sawtooth" pattern which is responsible for shortening compressor valve and bearing life, requiring an air receiver or surge tank to limit such fluctuation. This cyclic flow in the two column adsorber also produces large pressure variations in product gas flow, requiring the use of a pressure reducing regulator in the dispensing conduit. The abrupt, large pressure changes also require extensive silencing.

Furthermore, to provide an ambulatory patient with acceptable mobility and quality of life, a supplementary oxygen supply system must be reliable, economical, compact, portable and light in weight. The instant invention provides a system which addresses all these parameters.

SUMMARY OF THE INVENTION

This invention encompasses improved apparatuses for fractionating a fluid mixture by pressure swing molecular adsorption. These apparatuses contain a plurality of adsorber columns and a chamber functioning as a purified product holding tank.

The heart of the apparatuses are unique, rotary distributor valve assemblies for sequentially pressurizing and exhausting each column. This allows pressurization of one of the columns while simultaneously purging the adsorbent medium in another of such columns.

This invention further encompasses improved processes for removing fluid components by selective adsorption of particular fluids from a stream of a mixture of fluids or a contaminating fluid component from a stream of a single fluid.

An incoming stream of a pressurized fluid mixture is sequentially distributed by means of rotating members of the rotary distributor valves of the alternative embodiments disclosed herein into a plurality of columns packed with an adsorbent which is selective for the fluid or the contaminant fluids to be removed. The contaminants are retained by the adsorbent and the desired product fluid is allowed to pass through. By simultaneously refluxing product fluid under low pressure, through columns other than columns being pressurized, the contaminant is desorbed and exits the system.

Novel, smaller, smoother in operation, simpler and more reliable apparatuses for providing supplementary oxygen to patients are presented below as exemplary embodiments of the instant invention. Improved methods of fractionating fluid mixtures, which arise out of judicious use of the described apparatuses, are also presented.

BRIEF DESCRIPTION OF THE DRAWINGS

FIG. 14 is a sectional view taken on line 14—14 of FIG. 13;

FIG. 15 is an underside view of the rotor shoe as taken on line 15—15 of FIG. 13;

FIG. 16 is a sectional view taken on line 16—16 of FIG. 15; and

FIG. 17 is an enlarged sectional view taken on line 17—17 of FIG. 12.

DESCRIPTION OF THE PREFERRED EMBODIMENTS

Figure 1:
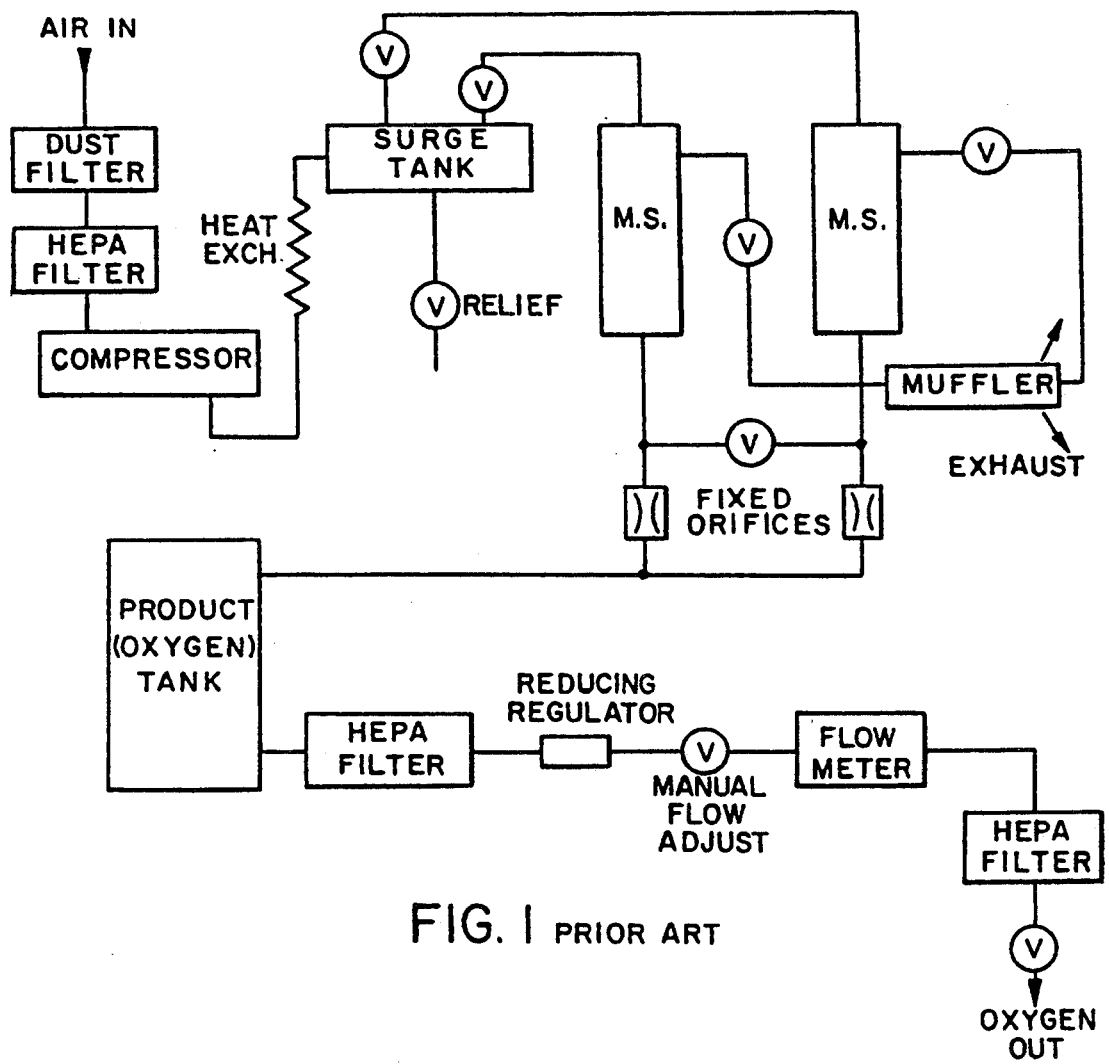
FIG. 1 depicts schematically a typical two-column adsorbent fractionating prior art system commercially available.

FIG. 1 depicts schematically a typical small two-column oxygen concentrator commercially available for patient use. It can readily be seen from the schematic diagram that a typical medical oxygen concentrator is a complex machine, with a multitude of interconnected and interacting parts. Attendant with this manifold complexity is the prospect of decreased reliability, or the increased chance that some component will fail, rendering the entire apparatus incapable of performing its life-supporting function.

Figure 2:
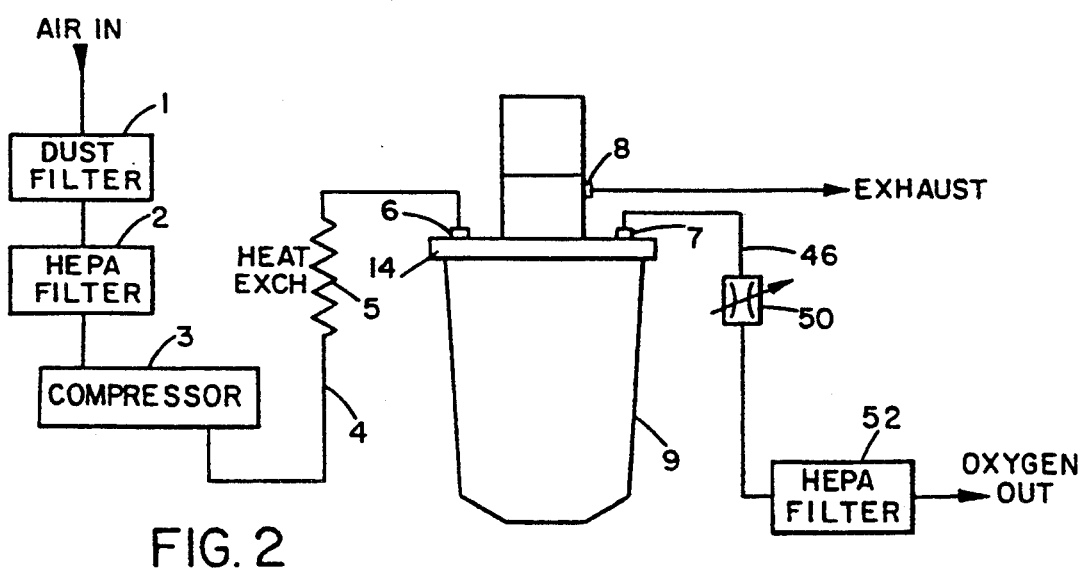
FIG. 2 is a schematic representation of one embodiment of the entire fluid fractionator respiratory support system of the instant invention.

One embodiment of this invention, with its unique design which requires far fewer parts, will be described by following a volume of mixed fluids (air in this case) as it moves through the fractionation procedure. In FIG. 2, ambient air is drawn in through a pair of filters, one dust 1 and one high efficiency particle arrestor (HEPA) 2 connected in series, by a compressor 3. The air is compressed and forced within a conduit 4 into a heat exchanger 5. (It should be noted that the filters shown in both FIG. 1 and 2 could follow, rather than precede, the compressor). The heat exchanger removes most of the neat of compression before the air is fed into the inlet pore 6 of the fluid fractionator. The cooling air in the exchanger is provided by a fan mounted on the compressor shaft, thereby, obviating the requirement of an additional motor and energy source. After most of the nitrogen is removed by the adsorber columns of the fractionator, an oxygen-rich fraction is tapped off through an outlet port 7 to the dispensing conduit, while the desorbed nitrogen is purged by the balance of the oxygen-rich product flow and leaves through an exhaust port 8.

Figure 3:
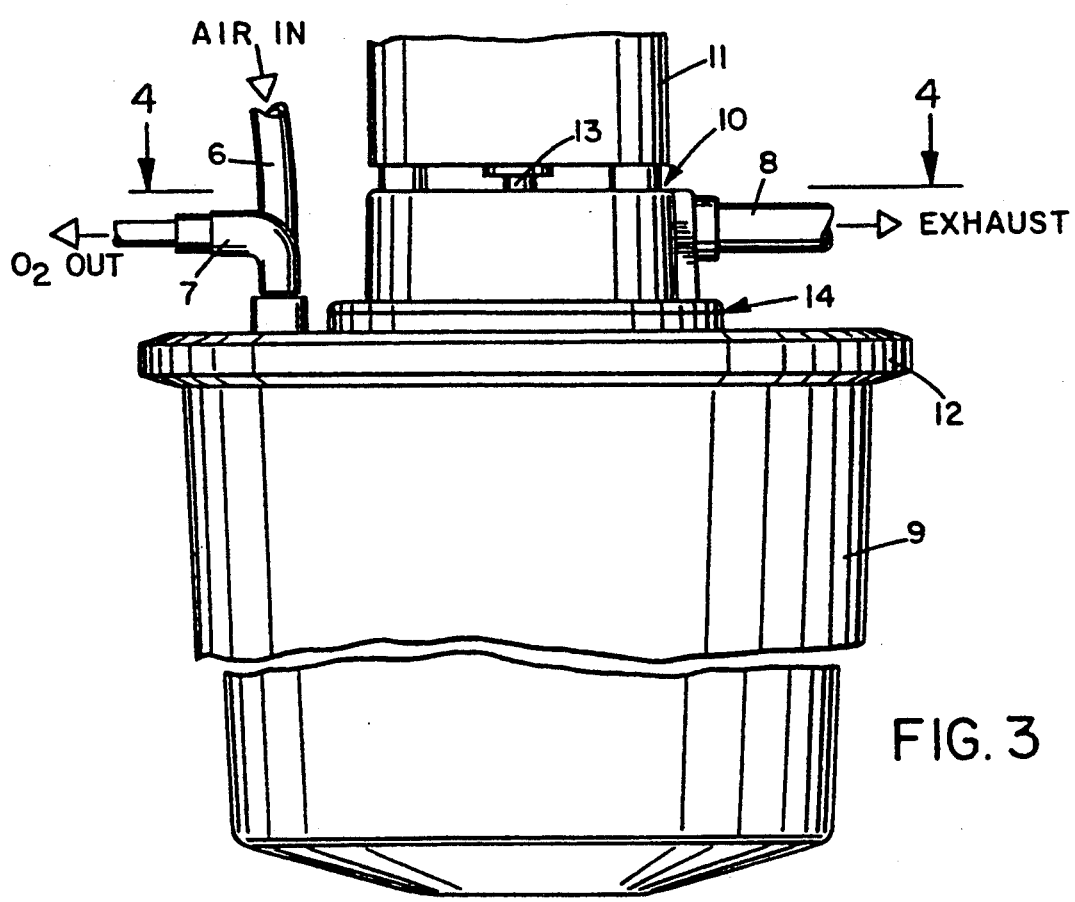
FIG. 3 is a side elevation view of the apparatus which is the subject of FIG. 2.

The fluid fractionator, in FIG. 3, comprises a product holding tank 9 containing a cluster or array of adsorber columns within its housing, a rotary valve distributor 10 and a gear motor 11.

Figure 4:
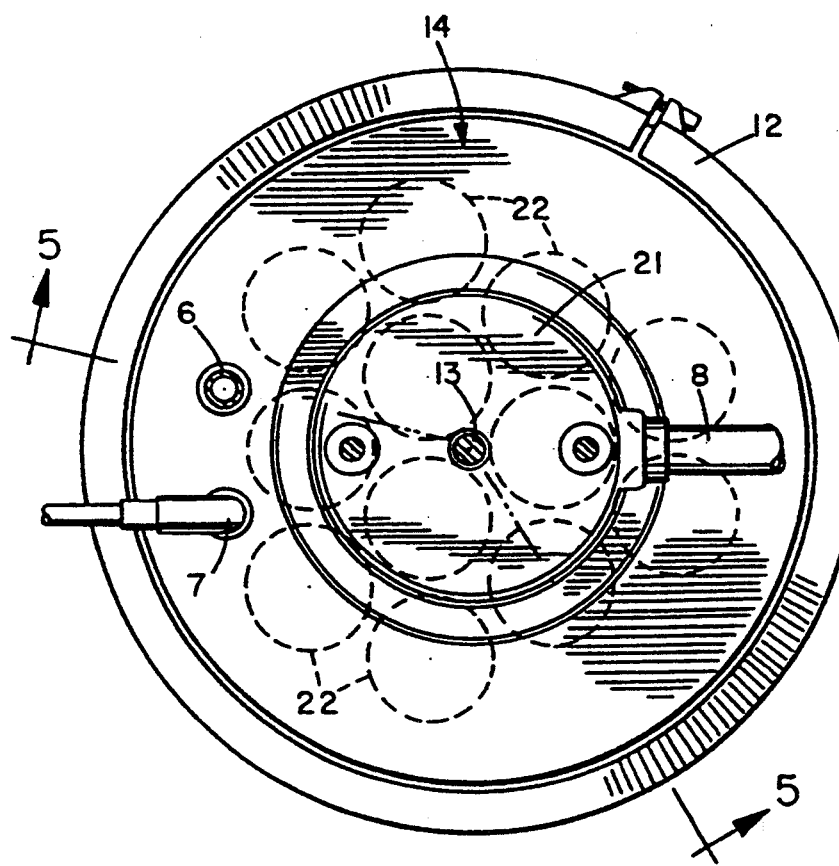
FIG. 4 is a view taken on line 4—4 of FIG. 3.

FIG. 4, a view taken on line 4—4 of FIG. 3, shows the arrangement of an array of columns 22 within the holding tank relative to the inlet 6, outlet 7 and exhaust 8 ports of the rotary distributor valve assembly, which is affixed to the holding tank by means of a clamp band 12. Twelve columns are shown in this case but there could be any number of two or more.

Figure 5:
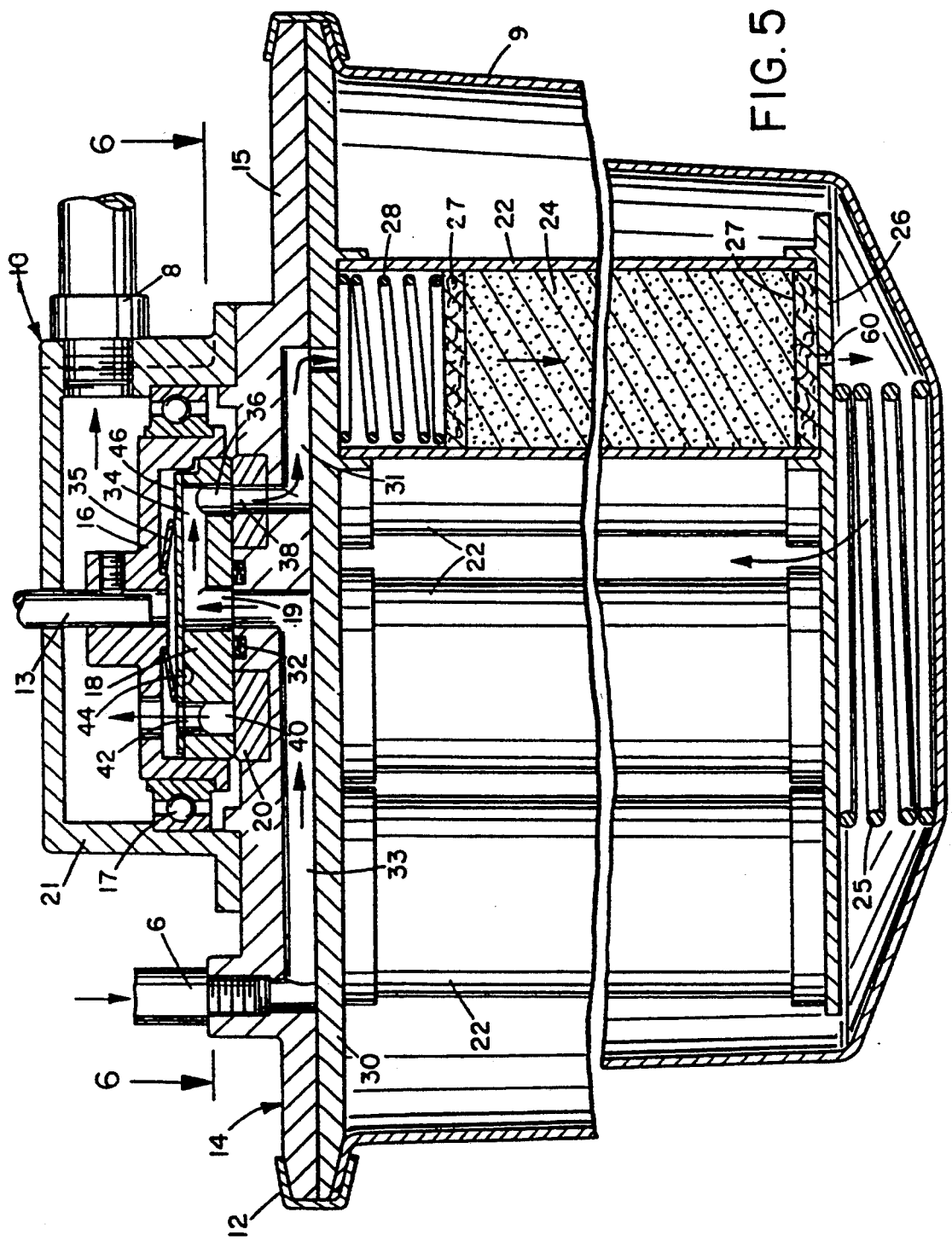
FIG. 5 is an enlarged sectional view taken on line 5—5 of FIG. 4.

The rotary distributor valve depicted in FIG. 5, which is an enlarged sectional view taken on line 5—5 of FIG. 4, comprises a ported and channelled two-piece manifold 14 and a rotor 16 with a ported rotor shoe 18 and a cover plate 46, the rotor 16 being driven by a gear motor 11 (FIG. 3) at about two revolutions per minute, with the rotor 16 turning in circumferential ball bearing unit 17. Conical disk or Belleville spring 35 urges cover plate 46 and rotor shoe 18 downward to secure them in position. The rotor 16 and its associated components are enclosed by cover 21, which is attached to manifold 14.

Following the arrows indicating fluid flow direction, the two-piece manifold 14 contains a top section 15 which is ported and channeled to take in a stream of fluid through the inlet port 6 and channel it through an air feed passage 33 into a centrally located inlet port 19 in the rotor shoe 18, and subsequently to channel the fluid mixture exiting the rotor shoe radially from a circular array of inlet ports located in the port plate 20 towards each column 22 of an array of columns arranged about the center of the manifold. Each of these columns contains a bed of adsorbent material 24 (zeolite in this case) which is selective for a particular molecular species of fluid or contaminant. The packed bed is held in place by a plate 26 at the bottom and perforated plates 27 at top and bottom with a spring 28 at the top. The bottom plate has a pressure-dropping means such as a small orifice 60, the diameter of which is empirically determined, at the center of each column.

The bottom half of the manifold, which is also an upper column header plate 30, affixed to the top half of the manifold by means of a clamp band 12, acts as a cover for the channels and has the array of columns attached to its underside. The channels in the manifold are sealed by a gasket or sealing compound.

Recessed into the top of the manifold, coaxial to the exit port of the air feed channel 33, sealed and immobilized by means of a slot and key, is the port plate 20 which contains a number of holes in an equally spaced circular pattern, equal in number and aligned with the circular distribution of entry ports of channels to individual columns in the manifold. The manifold has a groove machined into its upper surface, just inside the port plate, which contains an air inlet rotary seal 32. The port plate is made from a suitable hardened material.

The other major component of the rotary distributor valve is a gear motor-driven rotor 16 containing a ported rotor shoe 18, which slides over the rotor plate (FIGS. 5, 6, 7, and 8 all depict various aspects of the rotor/shoe). The rotor shoe is made from material known in the art to be suitable for use with the hardened material comprising the port plate, and is held in position over the rotor plate by spring-loaded or pressure compensated means. Shown is a conical or Belleville pressure compensating spring to counteract supply pressure. An arrangement of small coil springs can also be utilized for this purpose.

Figure 6:
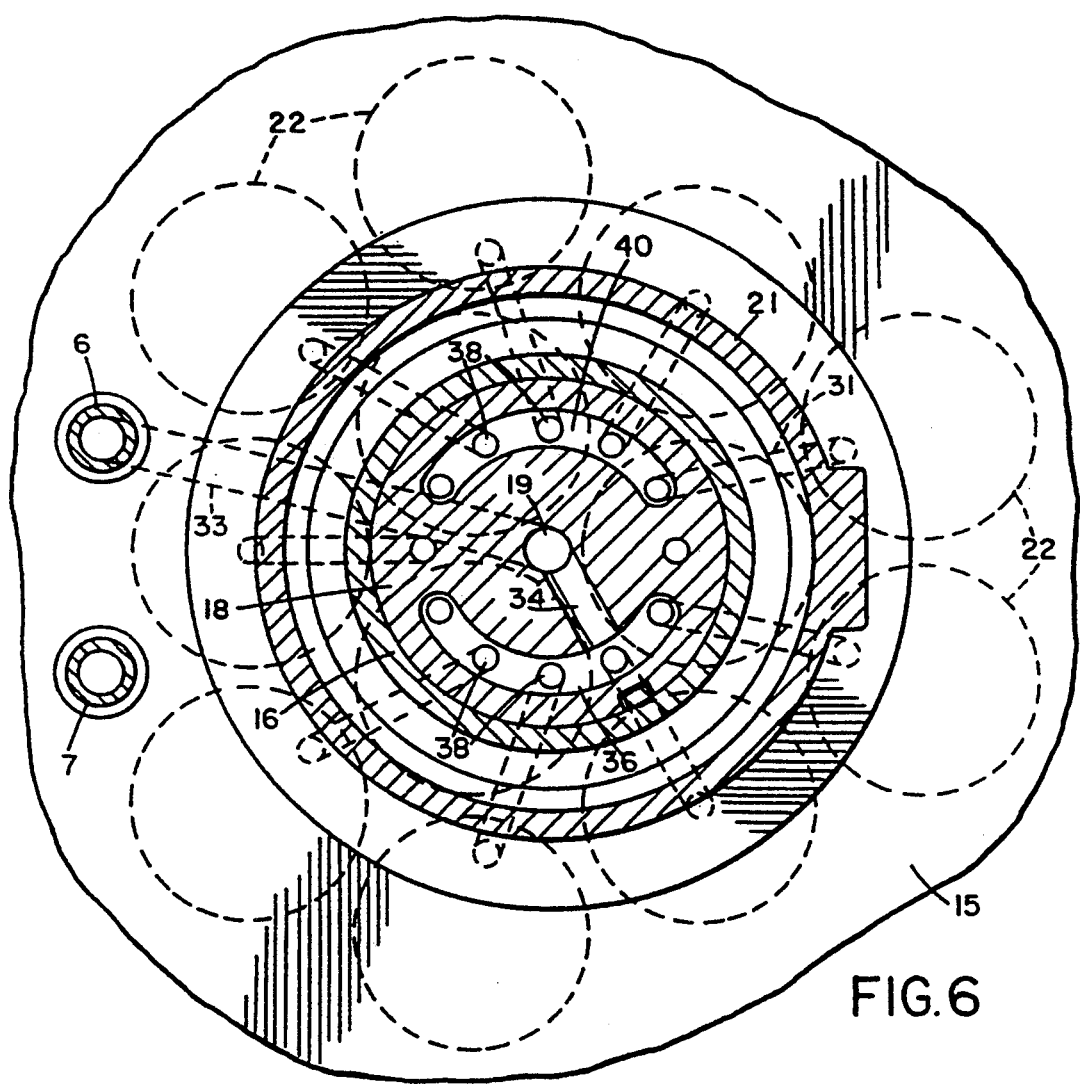
FIG. 6 is a sectional view taken on line 6—6 of FIG. 5.

In the rotor shoe, there are three channels. One channel is a pressurizing channel or air feed passage 34 originating at the central fluid inlet port 19, and radiating into an arcuate slot 36 to simultaneously serve as a conduit into several of the circularly positioned ports in the port plate. As the rotor shoe turns, each new port appearing in the slot is pressurized, and the port the other end of the slot passes out of the slot and is depressurized. Full system pressure is maintained at all intermediate ports. FIG. 6, a sectional view taken on line 6—6 of FIG. 5, shows the relationship of the arcuate air feed port or slot 36 of the rotor shoe 18 and the receiving ports 38 in the port plate, as well as the air feed channels 31 to each of the columns 22.

In another channel, the wide exhaust port 40 collects refluxed fluid impurities desorbing and exiting from the columns, and channels them out through an exhaust outlet 8 (FIG. 5), through a "silencer" and into the atmosphere.

Figure 7:
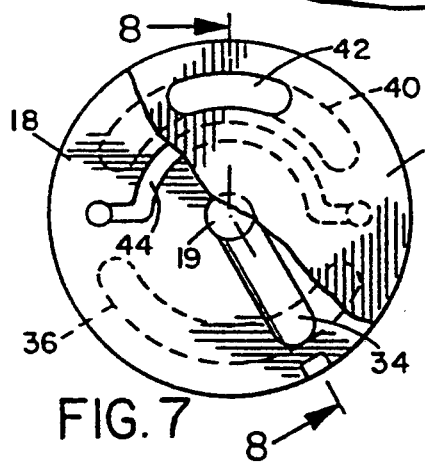
FIG. 7 is a top plan view, partially cut away, of the rotor shoe, of the embodiment depicted in FIG. 2.

FIG. 7 is a top plan view, partially cut away, of the rotor shoe. Several other features come into view here. The desorbed columns are vented upward through the exhaust slot 40, through a vent 42 in the rotor shoe cover plate 46, into the rotor void space, and out through the exhaust port 8 (FIG. 5).

The third channel is a cross-port channel 44 which serves as a conduit between two columns which are in transition between the pressurizing and desorbing phases of a cycle. Its purpose is to quickly equalize pressure in columns transitioning between the adsorbing and desorbing cycles. This feature enhances product concentration at high product flow rates.

The purge flow rate is the rate at which the purging fluid flows countercurrent to adsorption during regeneration of the columns. There is an optimal purge rate for maximal removal of nitrogen during regeneration. A very high purge rate causes the pressure within a bed to be greater than atmospheric, resulting in reduced desorption efficiency. The cross-porting channel in the rotor shoe allows a pressure drop in the column bed before it enters the desorption cycle. This prevents a very rapid decompression and thus excessively high initial purge flow.

This effect is easily measurable by simple instrumentation; however, its basis at the molecular level is not understood.

Figure 8:
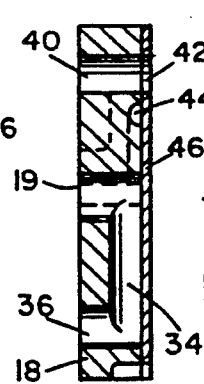
FIG. 8 is a sectional view taken on line 8—8 of FIG. 7.

FIG. 8 is a sectional view taken on line 8—8 of FIG. 7, showing the routing of the pressurizing 34, cross-porting 44 and exhausting 40 channels in the rotor shoe 18.

Figure 9:
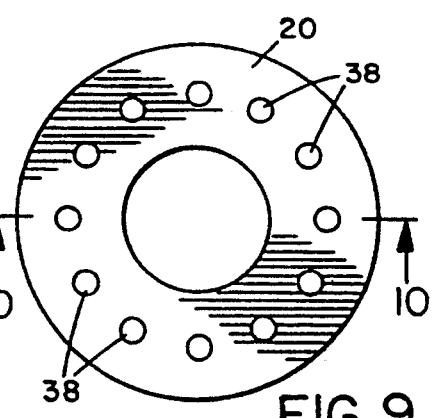
FIG. 9 is a top plan view of the port plate of the embodiment depicted in FIG. 2.
Figure 10:
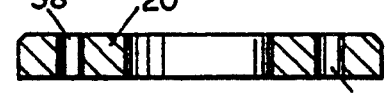
FIG. 10 is a sectional view taken on line 10—10 of FIG. 9.

FIG. 9 is a top plan view of the port plate showing the circular location of ports of channels leading to each of the array of columns, and FIG. 10 is a sectional view taken on line 10—10 of FIG. 9.

Figure 11:
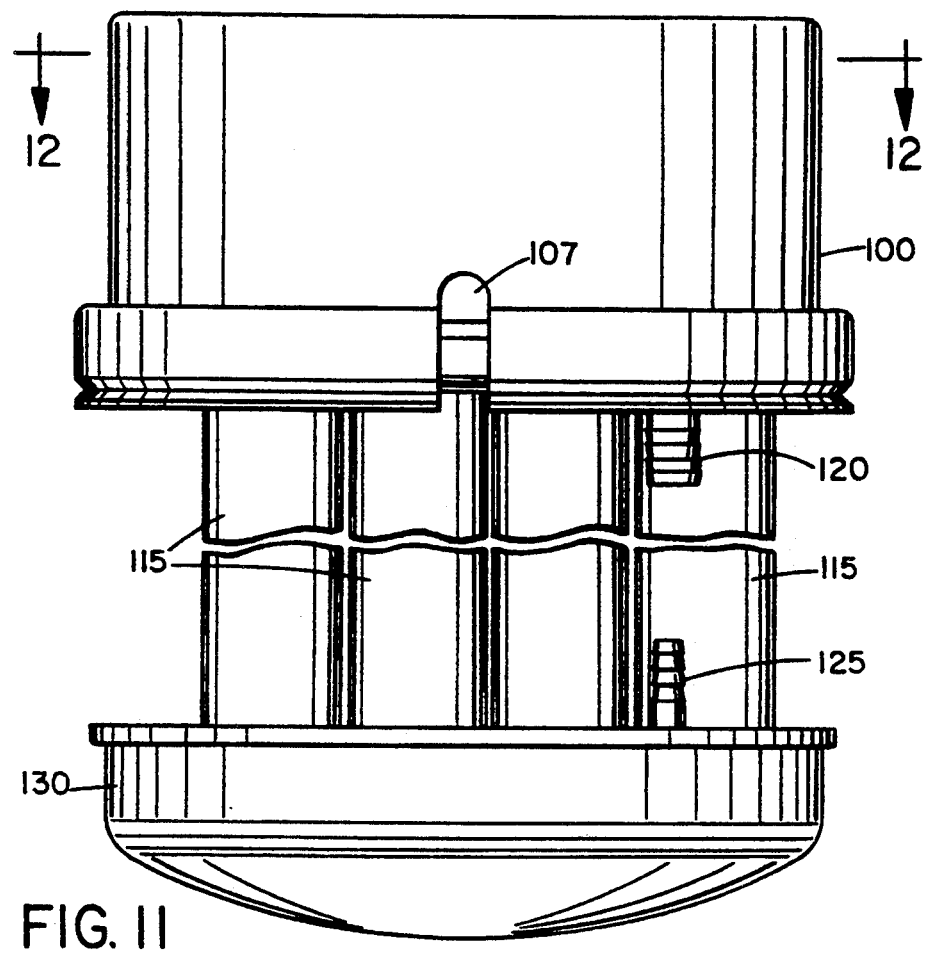
FIG. 11 is a side elevational view of an alternative configuration of the unit.
Figure 12:
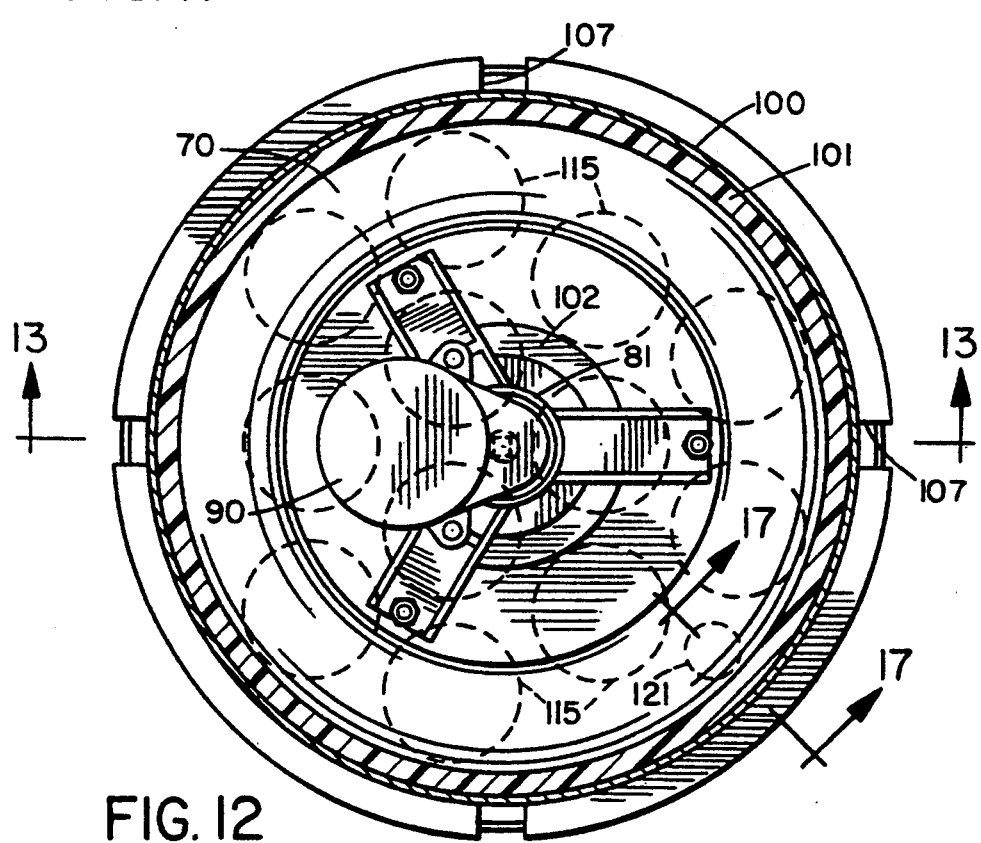
FIG. 12 is a sectional view taken on line 12—12 of FIG. 11.

FIG. 11 depicts an alternative embodiment of the apparatus of this invention, with a sectional view taken on line 12—12 thereof shown in FIG. 12. This latter view shows an array of adsorber columns similar to the columns 22 depicted in FIG. 4. As in FIG. 4, twelve columns are the preferred number shown in the embodiment of FIG. 12, but there could be any number of two or more. It should be noted, however, that a length to diameter ratio of greater than 6:1 for the adsorber columns is preferred with the only limit on length being a practical one. This ratio permits the adsorption medium to be retained within the columns without the use of springs to compress and retain the adsorption media therein. At least one layer of filter media must, however, be present at each end of the column to avoid loss of adsorption medium through the inlet and outlet orifices to and from the columns. A cap 165 will be mechanically seated over the distal end of each of said columns, through which outlet orifice (not shown) to product tank 130 (FIG. 13) extends.

Figure 13:
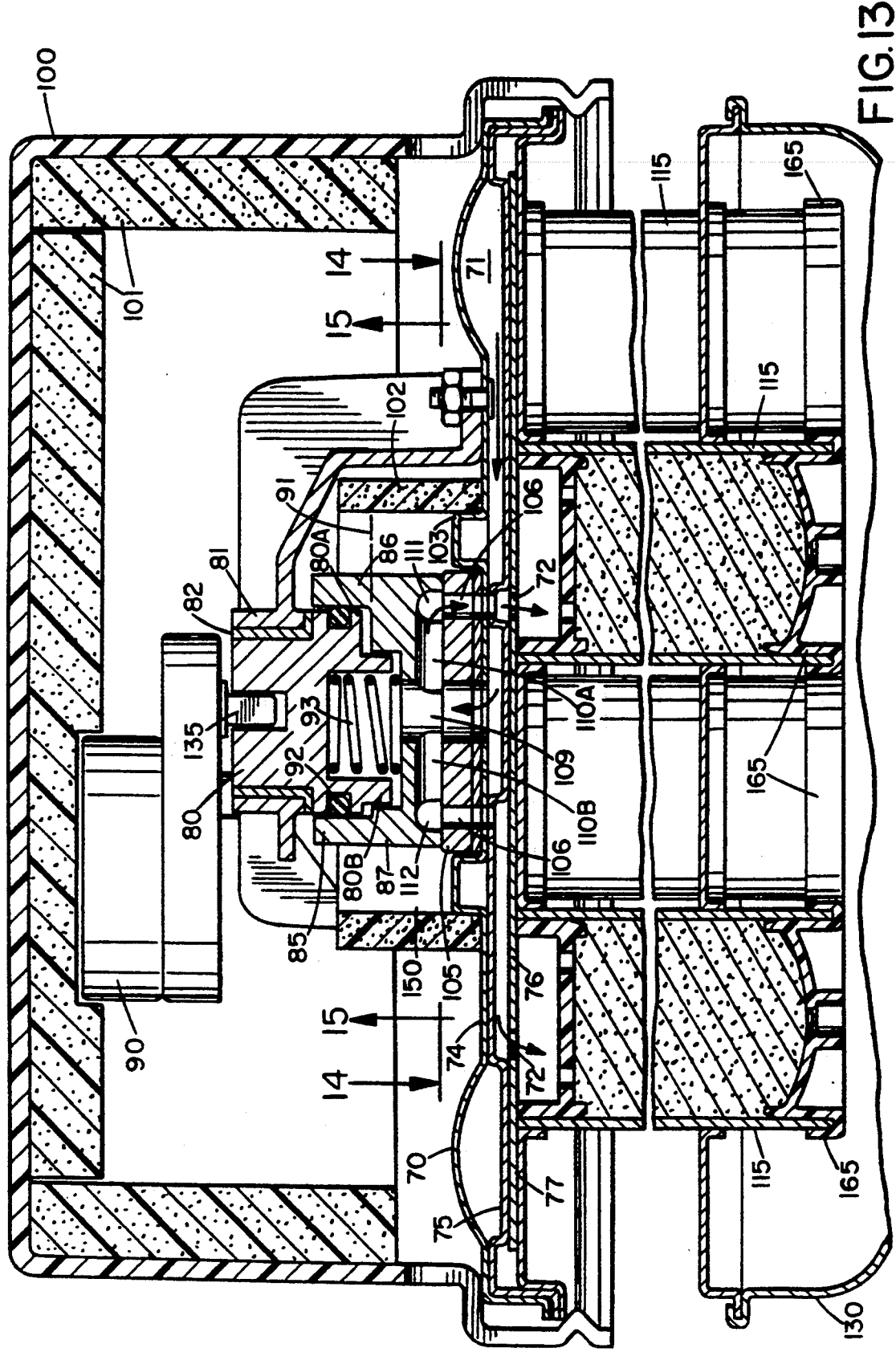
FIG. 13 is an enlarged sectional view taken on line 13—13 of FIG. 12.

The rotary distributor valve depicted in FIG. 13, which is an enlarged sectional view taken on line 13—13 of FIG. 12, comprises a manifold 70 which is formed from one or more layers of aluminum, which layer or layers are pierced, and/or die formed or embossed and when, if a multiplicity of layers is used, sealed in a stacked configuration (by lamination or equivalent means) to form fluid channels. Four layers of aluminum (74, 75, 76 and 77) are shown in FIG. 13; it will be appreciated, however, that one or more layers of any lightweight, rigid, low density material (such as a-b-s resin plastic) may be used.

The rotary valve further comprises a rotor shaft 80 rotatably retained within bearing housing 81 and within rotor shoe 85. Rotation of rotor shaft 80 is permitted by the presence of O-ring 92 around its circumference. Rotor shaft 80 is driven by gear motor 90 via motor shaft 135 at about one revolution per minute. As depicted in FIG. 13, said rotor shaft 80 is concentrically shaped above line 91 and eccentrically shaped below line 91. The eccentric shape is achieved by enlarging the lateral thickness of side wall 80A of rotor shaft 80 with respect to side wall 80B.

Rotor shoe 85 comprises a ported disc (similar in structure and composition to rotor shoe 18 depicted in FIG. 7) with raised side walls 86 and 87 which define a circular chamber into which rotor shaft 80 is seated. Rotor shoe 85 is driven by torque exerted by rotor shaft 80 when the latter is driven by gear motor 90. Compression spring 93 assists in sealing the shaft and shoe, thus maintaining the seal even when the apparatus is not in operation and compensating for wear experienced by the shaft and shoe. Use of this configuration to form a pressure balanced seal requires less torque to turn the rotor, and thus less energy to operate the system than required by prior art systems or the embodiment of FIGS. 3–10.

The pressure balanced seal between the rotor shaft and shoe is a function of the integrated pressure exerted on the surface of the rotor shoe between it and the rotor shaft during operation of the apparatus and the diameter of the rotor shaft. During operation, the fluid pressure at fluid inlet port 109 at the start of adsorption multiplied by the diameter squared of the rotor shaft (below line 91) and by $\pi/4$ is equal to the force exerted to form a seal between the shaft and shoe. As a result of this relationship, the shaft and shoe will remain sealed and balanced with respect to each other even if the fluid pressure at fluid inlet port 109 varies. It should be noted that there is a passage (not shown) from port 109 through to the interface surface between rotor shaft 80 and rotor shoe 105 which serves to pressurize the interface to help maintain the pressure balanced seal.

This apparatus also features an enhanced noise control design. As shown in FIG. 13, said noise control design comprises muffler housing 100, having inner and outer surfaces preferably formed by a flexible plastic, which snaps over manifold 70 to form a cover for the manifold and rotary valve distributor. The noise control design further consists of pieces of acoustical foam or equivalent acoustical attenuating material placed within the apparatus as follows: at 101, said foam conforms topographically, in one or more pieces, to the inner surface of muffler housing 100. At 102, acoustical foam is seated vertically between bearing housing 81 and manifold 70. Said foam 102 may be retained in place by a portion of layer 74 of manifold 70 formed to provide a stop 103 between foam 102 and port plate 105.

In operation, sound waves emitted by the operation of the rotary valve distributor escape from exhaust ports 113 and 114 in the rotor shoe into the annular air space 150 between the shoe and acoustical foam 102. Those sound waves not dissipated by striking foam 101 and 102 eventually escape from slots 107 in the walls of muffler housing 100. The noise control design would, therefore, be considered in the art as a reactive muffler.

Recessed into layer 74 of manifold 70 is port plate 105. Port plate 105 is similar in structure to port plate 20 of the embodiment depicted in FIG. 5, except that, while the inlet ports therein to the adsorber columns (one port per column) may be of any shape, they are preferably in the shape of wedges and most preferably in an arched keystone shape which will circumscribe the orifices 160 leading into the columns 115 via air feed channels 116 (FIG. 14). Wedge-shaped inlet ports are best depicted at 106 of FIG. 14, which is a sectional view taken on line 14—14 of FIG. 13.

As in the embodiment of the apparatus shown in FIGS. 3–10, fluid is directed to the inlet ports 106 in port plate 105 for passage to the adsorber columns via channels in the rotor shoe. As best depicted in FIG. 15, rotor shoe 85 comprises three sets of channels. The first set of channels consist of pressurizing channels 110A and 110B which extend respectively and radially from central fluid inlet port 109 to symmetrical air feed ports 111 and 112 (while two air feed ports are shown, it will be appreciated that more than any number of two or more may De used as long as the ports are arranged in axial symmetry about inlet port 109). In terms of direction of flow, fluid travels through fluid inlet port 109 to air feed ports 111 and 112 through ports 106 in port plate 105 to air feed channels 116 (shown in FIG. 14) which lead from each port 106 to an adsorber column (shown in sectional view in FIG. 14 at 115).

The second set of channels consist of at least two exhaust ports (113 and 114 in FIG. 15) which will be equal in number to air feed ports 111 and 112 and will also be arranged with axial symmetry with respect to inlet port 109. The desorbed columns are vented upward through exhaust ports 113 and 114, to annular air space 150 and eventually to the atmosphere via slots 107 in muffler housing 100 (FIG. 13).

The third set of channels are at least one pair of symmetrical cross-port channels 118 and 119 (equal in number to air feed ports 111 and 112). These channels serve to quickly equalize pressure between columns transitioning between the adsorption and desorption phases much in the same manner as does the single cross-port channel 44 depicted in FIG. 7.

The number and symmetry of shape and size common to each set of channels avoids the preloading spring which results from the use of asymmetrical ports, where variances between the fluid pressure present at the air feed and exhaust ports may push the rotor shoe against the port plate during operation.

Excepting the points of difference described above, the apparatus of FIGS. 11–17 is substantially similar to the apparatus of FIGS. 3–10.

The preferred method of fractionating air To provide an oxygen-rich air supply to a patient is described below.

Fractionation Method

At this point it is reiterated that although air fractionation is described, the method is effective in fractionating other fluids.

In the embodiment of the apparatus of FIGS. 3–10, the method of fractionation is as follows: compressed air enters the inlet port 6 of the manifold (FIG. 6) and is channeled through the air passage in the manifold 33 communicating with the rotor shoe 18 and then into the arcuate pressurizing slot 36 to enter sequentially into several ports 38 in the port plate as the rotor shoe 18 turns. As these ports become pressurized, the gas mixture enters, pressurizes and flows through each attached column 22 where the separation takes place.

Referring now to FIG. 5, the desired gas, oxygen in this case, is free to move through the zeolite adsorbent bed 24 (e.g., similar to that provided by the molecular sieve division of UOP), while the undesired gases and vapor (nitrogen plus $CO_2$, CO, $H_2O$) are retained, because of their molecular size and the relatively high pressure and low temperature, in the matrix of the adsorbent bed.

The purified desired gas product (oxygen) moves out of the column through a pressure-dropping means such as a small orifice 60 or a fluid porous plug in the bottom of the column and into the circumscribed product tank 9. From the product tank, a relatively small portion of the oxygen is tapped off by the distribution system conduit at the outlet port 7 (FIG. 6) for use by the patient, and another, relatively large, portion enters the columns in the opposite bank, which are under nearly atmospheric pressure, through corresponding small pressure dropping/flow restricting orifices in the bottom to reflux through the bed in a direction opposite to gas flow during pressurization. The amount of product used to purge versus the amount delivered by the distribution system can vary, depending on the degree of product purity desired. This backwash of product gas at pressure lower than the adsorbing cycle removes the contaminant embedded in the zeolite matrix, in this case nitrogen, and flushes it out through the top of each column into the manifold 14, the port plate 20 and through the rotor shoe 18 and exhaust outlet 8 into the atmosphere via a silencer or muffler.

Referring back to FIG. 2, the tapped oxygen-rich product gas then moves within a dispensing conduit 46 through a manually controlled valve 50 with a flow meter, through a final filter (HEPA) 52 and to the dispensing terminus.

In the embodiment of the apparatus shown in FIGS. 11–17, the method of fractionation is as follows: compressed air enters the manifold from inlet conduit 120 through inlet port 121 (FIGS. 14 and 17) and is channeled through channel 71 communicating with the rotor shoe 85 via central fluid inlet port 109. The air then passes through radial channels 110A and 110B to inlet ports 111 and 112. As the rotor shoe turns over port plate 105, inlet ports 111 and 112 will each become aligned with an equal plurality of wedge-shaped ports 106, thus allowing the air to enter the columns 115 via air feed channels 116 corresponding with each plurality of pores 106 served respectively by inlet ports 111 and 112. Absorption occurs within the columns as described above.

The purified product is retained within produce tank 130 after exiting the column via pressure-dropping means such as orifice 60 depicted in FIG. 5. Product tank 130 (FIG. 11) differs from product tank 9 (FIG. 5) in than tank 130 is smaller in volume and does not surround columns 115 except at their distal ends; i.e., opposite manifold 70. This smaller product tank (vis-a-vis product tank 130 (FIG. 11) reduces the overall weight of the system. As will be understood by those skilled in the art, the limits on reduction of the size of product tank 130 are practical ones, principally dictated by storage needs and the volume required to regulate the output pressure of the system sufficiently well to reduce the need for a pressure regulator.

Product is tapped for use by the operator or patient via outlet conduit 125. The system is then purged as described above with respect to the method used with the apparatus depicted in FIGS. 3–10.

In both embodiments and methods described above, when the motor is operated at the specified speed (i.e., 1 revolution per minute for the embodiment of FIGS. 11–17 and 2 revolutions per minute for the embodiment of FIGS. 3–10), and the inlet and exhaust ports in the rotor shoe are equal in size, the cycle profile is such that each column is pressurized for approximately 12.5 seconds, equilibrated for 2.5 seconds, and desorbed for 12.5 seconds and re-equilibrated. This profile of the cycle is obtainable only when the intake and exhaust slots in the rotor shoe are equal in size, and service an equal number of columns. The profile can be altered as desired by varying the size of the respective inlet and exhaust ports. This is a desirable feature which cannot be put into effect in any of the prior art mechanisms.

As the rotor rotates over the rotor plate, this cycle is sequentially and continuously established for each column. This mode of operation produces a relatively constant flow of product, improving with a greater number of columns, eliminating the need for a pressure reducing regulator. The average product outlet pressure is nearly constant and about twice the regulated delivery pressure of prior art fractionators.

Some other advantages of the present invention are outlined hereunder. Because of the large number of relatively small diameter adsorber columns, the column length may be short, even with a large length:diameter ratio which is essential for effective adsorption separation. The large number of columns and the rotary distributor valve result in a quasi steady-state gas flow through the compressor and other components which produces a number of advantages and system simplifications. The invention permits optimization of the adsorption cycle by providing the possibility of employing unequal times for the adsorption and desorption phases of the cycle. Prior art two chamber systems are inherently bound to equal times.

Another notable advantage of the invention is the elimination of many components which are necessary in the prior art, thereby, reducing size, weight and the amount of maintenance, concomitantly increasing reliability and maneuverability for the ambulatory patient. These eliminated components include:

Air receiver or surge tank
Four or five solenoid valves (or a 4-way valve and one 2-way solenoid valve)
Electric or electronic sequencing control for the solenoid valves
Pressure reducing regulator
Almost all connecting tubing and fittings The elimination of almost all "plumbing" decreases size and weight, the potential for system leaks and reduces manufacturing costs.

Although the adsorbent material utilized in this embodiment is a synthetic zeolite, there are many other useful adsorbents available; therefore, this invention should not be construed as restricted to its use. It is understood by those well versed in the art that many other configurations are possible while employing the rotary distributor concept, which are within the spirit and scope of this invention.

We claim:

1. In combination,
   a plurality of columns disposed in a closed loop, each of the columns having a length-to-width ratio of at least six to one (6:1),
   means for providing a fluid under pressure, the fluid having a first component and having components other than the first component,
   means operatively coupled to the fluid pressure means and the columns in the plurality for directing the fluid under pressure into first progressive ones of the columns in the plurality and for providing for the flow of the fluid in the columns from second progressive ones of the columns in the plurality at the same time as the direction of the fluid under pressure into the first progressive ones of the columns in the plurality,
   the fluid directing means being also operative to equalize the pressure of the fluid in third progressive ones of the columns in the plurality between the first and second progressive ones of the columns in the plurality at the same time as the directing of the fluid under pressure into the first progressive ones of the columns in the plurality,
   means disposed in the columns for passing the first component of the fluid and for adsorbing other components of the fluid,
   means for collecting the first component from the first progressive ones of the columns in the plurality, and
   means for exhausting to the atmosphere the fluid from the second progressive ones of the columns in the plurality.

2. In a combination as set forth in claim 1,
   the fluid directing means having a first plurality of channels symmetrically disposed relative to each other for directing the fluid under pressure into the first progressive ones of the columns in the plurality, a second plurality of channels symmetrically disposed relative to each other for providing for the flow of the fluid from the second progressive ones of the columns in the plurality at the same time as the directing of the fluid under pressure into the first progressive ones of the columns in the plurality and a third plurality of channels symmetrically disposed relative to each other for equalizing the pressure of the fluid in the third progressive ones of the columns in the plurality at the same time as the directing of the fluid under pressure into the first progressive ones of the columns in the plurality.

3. In a combination as set forth in claim 1, the columns in the plurality being cylindrical and being concentrically disposed about a common axial position, the fluid-directing means including first channels symmetrically disposed relative to each other about the common axial position for directing the fluid into the first progressive ones of the columns in the plurality and also including second channels symmetrically disposed relative to each other about the common axial position for providing for the flow of the fluid from the second progressive ones of the columns in the plurality at the same time as the directing of the fluid under pressure into the first progressive ones of the columns in the plurality and also including third channels symmetrically disposed relative to each other about the common axial position for equalizing the pressure of the fluid in the third progressive ones of the channels in the plurality at the same time as the directing of the fluid under pressure into the first progressive ones of the columns in the plurality, the first progressive ones of the columns in the plurality being symmetrically disposed relative to each other in the closed loop, the second progressive ones of the columns in the plurality being symmetrically disposed relative to each other in the closed loop, the third progressive ones of the columns in the plurality being symmetrically disposed relative to each other in the closed loop.

4. In a combination as set forth in claim 3, a housing for at least partially holding the columns in the plurality, and means disposed within the housing for attenuating any noise generated by the fluid directing means in directing the fluid under pressure into the first progressive ones of the columns in the plurality.

5. In a combination as set forth in claim 1, means for providing a filter medium at the output end of each of the columns in the plurality to avoid loss of the fluid passing and adsorbing means from such column during the passage of the first component of the fluid through such column and the adsorption of the other components of the fluid in such column.

6. In a combination as set forth in claim 5, the fluid passing and adsorbing means and the filter medium means constituting the only means in each of the columns in the plurality.

7. In combination, means for providing a fluid under pressure, the fluid having a first component and other components, a plurality of columns, more than two (2), disposed in a configuration defining a closed loop, means including a plurality of channels, first channels in the plurality being symmetrically disposed relative to each other for directing the fluid under pressure into first progressive ones of the columns in the plurality and second channels in the plurality being symmetrically disposed relative to each other for directing the fluid from second progressive ones of the channels in the plurality at the same time as the direction of fluid under pressure in the first progressive ones of the columns in the plurality, the first progressive ones of the columns in the plurality being symmetrically disposed in the closed loop and the second progressive ones of the columns being symmetrically disposed in the closed loop, means disposed in the columns in the plurality for adsorbing the other components in the fluid and for passing the first component in the fluid, and means for collecting the first component passing through the first progressive ones of the columns in the plurality.

8. In a combination as set forth in claim 7, the fluid directing means being annular and the first channels in the plurality being symmetrically disposed relative to each other in a diametrical direction and the second channels in the plurality being displaced from the first channels and being symmetrically disposed relative to each other in the diametrical direction.

9. In a combination as set forth in claim 7, third channels in the plurality symmetrically disposed relative to each other in the diametrical direction for equalizing the pressure of the fluid in third progressive ones of the columns in the plurality at the same time as the directing of the fluid under pressure into the first progressive ones of the columns in the plurality, the third progressive ones of the columns in the plurality being symmetrically disposed relative to each other in the closed loop.

10. In a combination as set forth in claim 9, the fluid directing means is annular and the first channels in the fluid directing means are symmetrically disposed relative to each other in the diametrical direction and the second channels in the fluid directing means are displaced from the first channels and are symmetrically disposed relative to each other in the diametrical direction and the third channels in the fluid directing means are displaced from the first and second channels and are disposed between the first and second channels and are diametrically disposed relative to each other a housing for at least partially holding the columns in the plurality, and means disposed within the housing for attenuating any noise generated by the fluid directing means in directing the fluid under pressure into the columns in the plurality.

11. In a combination as set forth in claim 10 wherein the second channels in the fluid directing means are further displaced in the diametrical direction than the first channels in the fluid directing means.

12. In a combination as set forth in claim 10 wherein the columns in the plurality have a length-to-diameter ratio of at least six to one (6:1).

13. In a combination as set forth in claim 9 wherein the columns in the plurality have a length-to-diameter ratio of at least six to one (6:1) and the third progressive ones of the columns in the plurality are symmetrically disposed relative to each other between the first and second progressive ones of the columns in the plurality.

14. In combination, a plurality of columns, means for providing a fluid under pressure into first progressive ones of the columns in the plurality, the fluid having a first component and other components, means disposed in the columns in the plurality for adsorbing the other components in the fluid in the columns in the plurality and for passing the first component in the fluid in the columns, means for providing for the passage of the fluid from second progressive ones of the columns in the plurality at the same time as the provision of the fluid under pressure into the first progressive ones of the columns in the plurality, means for collecting the first component of the fluid in the first progressive ones of the columns in the plurality, a housing covering the fluid providing and fluid passage means and at least partially covering the columns in the plurality, and means disposed in the housing for attenuating any noise generated by the fluid providing means and the fluid passage means.

15. In a combination as set forth in claim 14, the housing being constructed from a material having characteristics of muffling the noise.

16. In a combination as set forth in claim 14, the fluid providing means and the fluid passage means being included in a rotary distributor valve and a manifold, the housing being disposed on the manifold, and the attenuating means including means disposed between the manifold and the housing for attenuating any noise generated by the fluid passage means, and the manifold including means the means disposed between the manifold and the housing for holding in fixed position within the housing.

17. In a combination as set forth in claim 16, the housing being constructed from a material having characteristics for muffling the noise and having an inner wall, and the attenuating means including means disposed within the housing against the inner wall of the housing for further attenuating any noise generated by the fluid passage means.

18. In combination, a plurality of columns, more than two (2), disposed in an annular configuration, means for providing a fluid under pressure, the fluid having a first component and other components, means disposed in the columns in the plurality for adsorbing the other components in the fluid in the columns in the plurality and for passing the first component in the fluid in such columns, a manifold, a rotary valve, a distributor for co-operating with the rotary valve and the manifold for introducing the fluid under pressure into first progressive ones of the columns in the plurality to obtain the passage of the first component of the fluid through such columns and the adsorption of the other components of the fluid in such columns and for providing for the passage of the fluid from second progressive ones of the columns in the plurality at the same time as the introducing of the fluid under pressure into the first progressive ones of the columns in the plurality, and a housing disposed on the manifold for attenuating any noise generated by the rotary valve and the distributor, the housing being constructed from a material having characteristics of muffling the noise.

19. In a combination as set forth in claim 18, means disposed within the housing and conforming topographically to the contour of the housing and constructed from a material having characteristics of attenuating any noise generated by the rotary valve and the distributor.

20. In a combination as set forth in claim 18, means disposed between the housing and the manifold in a direction transverse to the manifold and made from a material having characteristics of attenuating any noise generated by the rotary valve and the distributor, and means included in the manifold for retaining the attenuating means in fixed position in the housing.

21. In a combination as set forth in claim 20, means disposed within the housing and conforming topographically to the contour of the housing and constructed from a material having characteristics of attenuating any noise generated by the rotary valve and the distributor.

22. In a combination as set forth in claim 21, means disposed in the walls of the housing for passing from the housing any noise not dissipated by the attenuating means and the topographically conforming means.

23. In a combination as set forth in claim 21, the rotary valve including first channels symmetrically disposed relative to each other for providing for the introduction of the fluid under pressure into the first progressive ones of the columns in the plurality and including second channels symmetrically disposed relative to each other for providing for the passage of the fluid from the second progressive ones of the ones of the columns in the plurality.

24. In a combination as set forth in claim 20, the columns in the plurality being cylindrical, each of the columns having a length-to-diameter ratio of at least six to one (6:1), the adsorbing means being the only means in the columns in the plurality.

25. In combination, a plurality of columns, first means for providing a fluid under pressure, the fluid having a first component and other components, second means disposed in the columns in the plurality for adsorbing the other components in the fluid in the columns in the plurality and for passing the first components in the plurality, third means for introducing the fluid under pressure into first progressive ones of the columns in the plurality to obtain the passage of the first component of the fluid through such columns and the adsorption of the other components of the fluid in such columns and for providing for the passage of the fluid from second progressive ones of the columns in the plurality, fourth means disposed at one end of the columns for providing for the passage of the first component of the fluid in the first progressive ones of the columns in the plurality, and a product tank extending from a position near the fourth means and enveloping the columns in the plurality at the ends near the fourth means for storing the first component of the fluid passing through the fourth means.

26. In a combination as set forth in claim 25, the third means including a manifold extending across the columns in the plurality at the end of the columns opposite the fourth means and including a rotor disposed in co-operative relationship with the manifold at a position further removed from the manifold than the fourth means for sequentially and cyclically selecting the first and second progressive ones of the columns in the plurality and the product tank enveloping the columns in the plurality at a position along the columns between the fourth means and the manifold.

27. In a combination as set forth in claim 26,
a housing disposed on the manifold and extending from the manifold in a direction opposite the disposition of the product tank, and
fifth means disposed in the housing for attenuating any noise created by the flow of the fluid from the second progressive ones of the columns in the plurality.

28. In a combination as set forth in claim 26,
the rotor including first channels symmetrically disposed relative to each other for implementing the introduction of the fluid under pressure into the first progressive ones of the columns in the plurality and including second channels symmetrically disposed relative to each other for implementing the passage of the fluid from the second progressive ones of the columns in the plurality.

29. In a combination as recited in claim 28,
the rotor including third channels symmetrically disposed relative to each other for equalizing the pressures in third progressive ones of the columns in the plurality, the third progressive columns in the plurality being disposed between the first and second progressive columns in the plurality,
a housing disposed on the manifold and extending from the manifold in a direction opposite the disposition of the product tank, and
fifth means disposed in the housing for attenuating any noise created by the flow of the fluid into the first progressive ones of the columns in the plurality and by the flow of the fluid from the second progressive ones of the columns in the plurality.

30. In a combination as set forth in claim 25,
the third means being operative to equalize the pressures in third progressive ones of the columns in the plurality, the third progressive ones of the columns in the plurality being disposed between the first and second progressive columns in the plurality.

31. In a combination as set forth in claim 25,
the columns being cylindrical and the columns have a length-to-diameter ratio of at least six to one (6:1).

32. In combination,
a plurality, more than two (2), of columns,
means for producing a fluid under pressure, the fluid including a first component and other components,
means disposed in the columns in the plurality for adsorbing the other components and for passing the first component,
a rotor,
means for driving the rotor,
a rotor shoe movable with the rotor, there being channels in the rotor for passing the fluid under pressure into first progressive ones of the columns in the plurality to obtain the adsorption of the other components in such columns and the passage of the first component through such columns and for passing the other components from second progressive ones of the columns in the plurality at the same time as the passage of the fluid under pressure into the first progressive ones of the columns in the plurality,
means disposed between the rotor and the rotor shoe for balancing the rotor and the rotor shoe, and
means for collecting and storing the first component of the fluid passing through the first progressive ones of the columns in the plurality.

33. In a combination as set forth in claim 32,
the columns being disposed in an annular configuration,
the rotor being disposed within the rotor shoe,
means disposed between the rotor and the rotor shoe for sealing the rotor and the rotor shoe, and
the balancing means being disposed between the rotor and the rotor shoe to assist in the sealing of the rotor and the rotor shoe and the balancing of the rotor and the rotor shoe.

34. In a combination as set forth in claim 33,
the balancing means including a compression spring between the rotor and the rotor shoe.

35. In a combination as set forth in claim 33,
the rotor shoe including first channels symmetrically disposed relative to each other for providing for the introduction of the fluid under pressure into the first ones of the progressive columns in the plurality and including second channels symmetrically disposed relative to each other for providing for the passage of the fluid from the second progressive ones of the columns in the plurality.

36. In combination,
a plurality of columns, more than two (2), disposed in an annular relationship,
means for providing a fluid under pressure, the fluid having a first component and other components,
means disposed in the columns in the plurality for adsorbing the other components in the plurality and for passing the first component of the fluid,
a rotor,
means for driving the rotor,
a rotor shoe disposed in enveloping and concentric relationship to the rotor for movement with the rotor, the rotor shoe having first channel means for directing the fluid under pressure into first progressive ones of the columns in the plurality on a cyclic basis and second channel means for directing the fluid from second progressive columns in the plurality on a cyclic basis at the same time as the passage of the fluid under pressure into the first progressive ones of the columns in the plurality,
means for collecting and storing the first component of the fluid passing through the first progressive ones of the columns in the plurality,
means disposed between the rotor and the rotor shoe for sealing the rotor and the rotor shoe relative to each other, and
means disposed between the rotor and the rotor shoe for pressure balancing the rotor and the rotor shoe.

37. In a combination as set forth in claim 36,
the rotor shoe enveloping the rotor in the radial direction and having a portion extending radially inwardly in axially spaced relation to the rotor and the balancing means being disposed between the radially extending portion of the rotor shoe and the rotor for pressure balancing the rotor shoe.

38. In a combination as set forth in claim 37,
the sealing means including an O-ring, and
the balancing means including a spring.

39. In a combination as set forth in claim 38,
the rotor shoe including a third channel disposed between the first and second channels for equalizing the pressure of the fluid in third progressive ones of the columns in the plurality on a cyclic basis at the same time as the passage of the fluid under pressure into the first progressive ones of the columns in the plurality.

40. In a combination as set forth in claim 36,
the rotor shoe including at least a pair of first channels symmetrically disposed relative to each other for directing fluid into the first progressive ones of the columns in the plurality and including at least a pair of second channels symmetrically disposed relative to each other for directing the fluid from the second progressive columns in the plurality and including at least a pair of third channels symmetrically disposed relative to each other for equalizing the pressure of the fluid in third progressive ones of the columns in the plurality.

41. In a combination as set forth in claim 36,
the columns in the plurality having a length-to-diameter ratio of at least six to one (6:1).

42. In a combination as set forth in claim 36,
a manifold disposed in co-operative relationship with the rotor shoe for implementing the direction of the fluid under pressure into the first progressive ones of the columns in the plurality and for implementing the flow of the fluid from the second progressive ones of the columns in the plurality,
a housing disposed on the manifold and extending in a direction opposite the collecting and storing means, and
means disposed in the housing for attenuating any noise generated as a result of the rotation of the rotor and the rotor shoe.

43. In combination,
means for providing a fluid under pressure,
a plurality of columns, more than two (2), disposed in a closed loop,
valve means for providing an introduction of the fluid under pressure into first progressive ones of the columns in the plurality on a cyclic basis and for providing for the flow of the fluid from second progressive ones of the columns in the plurality on the cyclic basis at the same time as the introduction of the fluid under pressure into the first progressive ones of the columns in the plurality,
the valve means being operative to provide for the introduction of the fluid under pressure into the first progressive ones of the columns in the plurality on a balanced basis and to provide for the flow of the fluid from the second progressive ones of the columns in the plurality on a balanced basis,
the valve means being rotatable, and
means for balancing the valve means during the rotation of the valve means.

44. In a combination as set forth in claim 43,
the valve means being operative on a balanced basis to equalize the pressure of the fluid in third progressive ones of the columns in the plurality at the same time as the introduction of the fluid under pressure into the first progressive ones of the columns in the plurality.

45. In a combination as set forth in claim 44,
a housing for holding the valve means and the balancing means and for at least partially enveloping the columns in the plurality,
the housing being made from a material for attenuating any noise generated by the operation of the valve means, and
means disposed within the housing for attenuating any noise generated by the operation of the valve means.

46. In a combination as set forth in claim 45,
the fluid under pressure having a plurality of different components, and
means disposed within the first progressive ones of the columns in the plurality for passing through such columns a first particular one of the components in the fluid.

47. In a combination as set forth in claim 43,
a housing for holding the valve means and the balancing means and for at least partially enveloping the columns in the plurality, and
means disposed within the housing for attenuating any noise generated by the operation of the valve means.

48. In a combination as set forth in claim 43,
the fluid under pressure having a plurality of different components,
means disposed within the first progressive ones of the columns in the plurality for passing through such columns a first particular one of the components in the fluid.

* * * * *